(12) United States Patent
Grinderslev

(10) Patent No.: US 8,827,567 B2
(45) Date of Patent: Sep. 9, 2014

(54) FIELD-INSTALLABLE EXPANDED BEAM CONNECTOR SYSTEM

(75) Inventor: Soren Grinderslev, Hummelstown, PA (US)

(73) Assignee: Tyco Electronics Corporation, Berwyn, PA (US)

( * ) Notice: Subject to any disclaimer, the term of this patent is extended or adjusted under 35 U.S.C. 154(b) by 166 days.

(21) Appl. No.: 13/486,624

(22) Filed: Jun. 1, 2012

(65) Prior Publication Data

US 2013/0039622 A1 Feb. 14, 2013

Related U.S. Application Data

(60) Provisional application No. 61/522,010, filed on Aug. 10, 2011.

(51) Int. Cl.
*G02B 6/36* (2006.01)

(52) U.S. Cl.
USPC .......................................................... 385/53

(58) Field of Classification Search
USPC .......................................................... 385/53
See application file for complete search history.

(56) References Cited

U.S. PATENT DOCUMENTS

| | | | |
|---|---|---|---|
| 4,770,488 A | 9/1988 | Shank et al. | |
| 4,807,958 A | 2/1989 | Gunner et al. | |
| 4,834,494 A | 5/1989 | DeMeritt et al. | |
| 5,073,027 A | 12/1991 | Krohn et al. | |
| 5,588,081 A | 12/1996 | Takahashi | |
| 5,606,182 A | 2/1997 | Yoshida et al. | |
| 6,307,998 B2* | 10/2001 | Williams Vigliaturo | 385/134 |
| 2003/0185497 A1 | 10/2003 | Zhou | |
| 2010/0027943 A1* | 2/2010 | Armani et al. | 385/74 |
| 2010/0104244 A1 | 4/2010 | Grinderslev | |
| 2010/0166372 A1 | 7/2010 | Durrant et al. | |

FOREIGN PATENT DOCUMENTS

| | | |
|---|---|---|
| EP | 0 053 914 A1 | 6/1982 |
| EP | 0 220 690 A2 | 5/1987 |
| EP | 0402017 A2 | 12/1990 |
| FR | 2 334 969 A1 | 7/1977 |
| GB | 2 180 955 A | 4/1987 |
| JP | 4 367806 A | 12/1992 |
| JP | 2003 255184 A | 9/2003 |
| JP | 2004 037984 A | 2/2004 |

OTHER PUBLICATIONS

Pitruzzello, et al, United States Statutory Invention Registration H491, Jul. 5, 1988, 3 pg, United States.
International Search Report, International Application No. PCT/US2012/049888, International Filing Date, Aug. 8, 2012.

* cited by examiner

*Primary Examiner* — Sung Pak

(57) ABSTRACT

An expanded beam connector kit, comprising a first lens assembly having a front and rear orientation and comprising at least a first base having a first interengagement mechanism for interengaging with a second interengagement mechanism of a first ferrule assembly, a first inner sleeve extending from the first base, a first lens disposed at least partially in the first inner sleeve such that the first lens is axially aligned in the first inner sleeve.

20 Claims, 3 Drawing Sheets

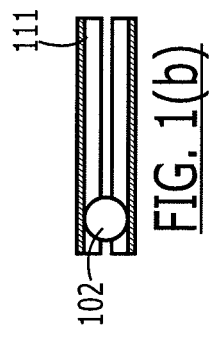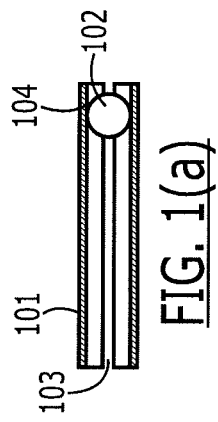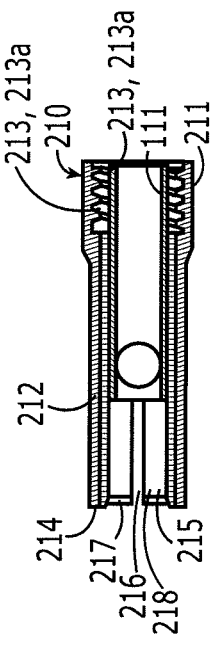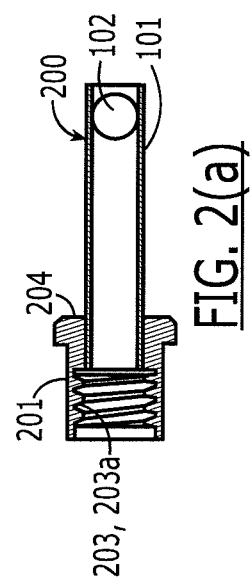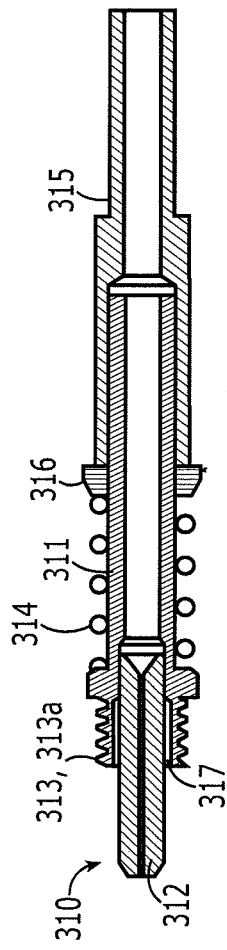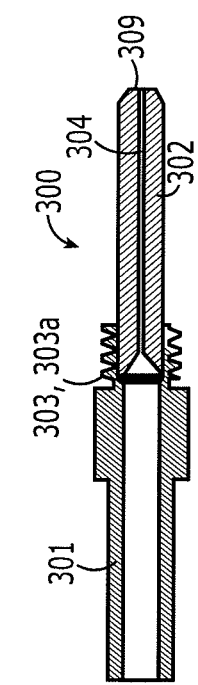

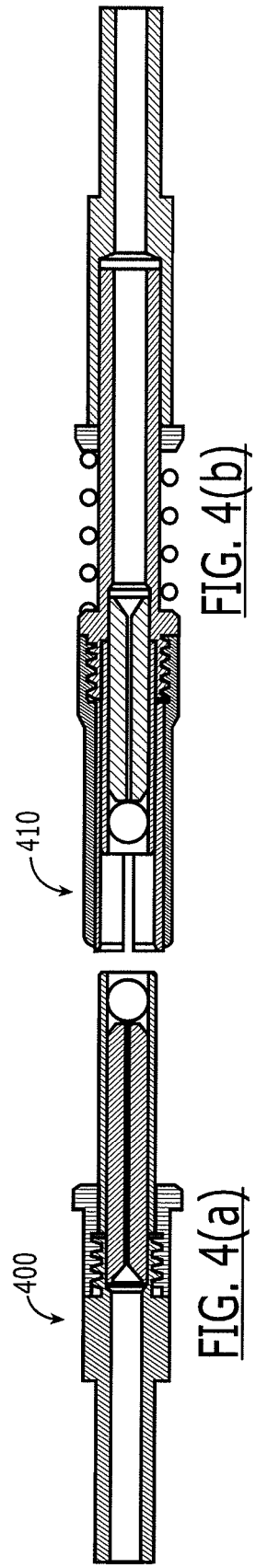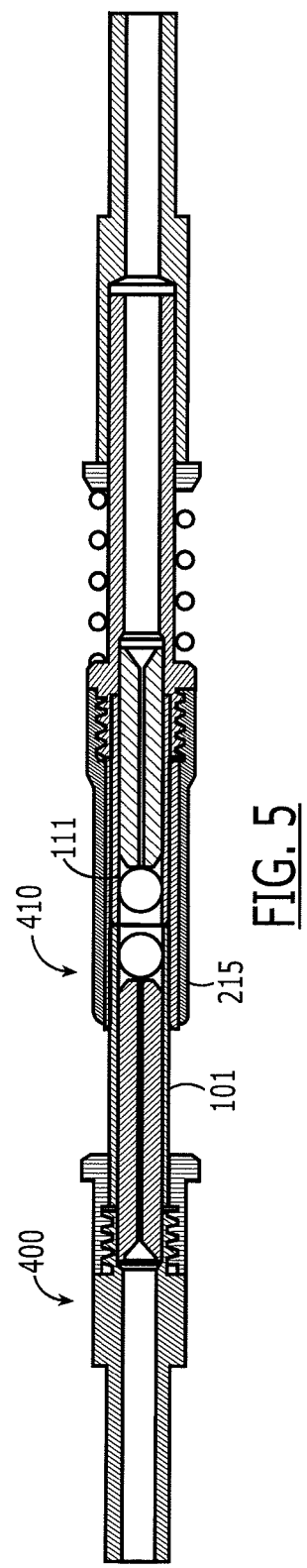

FIELD-INSTALLABLE EXPANDED BEAM CONNECTOR SYSTEM

REFERENCE TO RELATED APPLICATION

This application claims priority to Provisional Application No. 61/522,010, filed Aug. 10, 2011, incorporated herein by reference in its entirety.

FIELD OF INVENTION

The present invention relates generally to an expanded beam optical connector, and, more specifically, to a field-installable expanded beam optical connector system and method.

BACKGROUND OF INVENTION

Optical fiber connectors are a critical part of essentially all optical fiber communication systems. For instance, such connectors are used to join segments of fiber into longer lengths, to connect fiber to active devices, such as radiation sources, detectors and repeaters, and to connect fiber to passive devices, such as switches, multiplexers, and attenuators. The principal function of an optical fiber connector is to hold the fiber end such that the fiber's core is axially aligned with an optical pathway of the mating structure. This way, light from the fiber is optically coupled to the optical pathway.

Of particular interest herein are "expanded beam" optical connectors. Such connectors are used traditionally in high vibration and/or dirty environments, where "physical contact" between the fiber and the light path of mating connector is problematic. Specifically, in dirty environments, particulates may become trapped between connectors during mating. Such debris has a profoundly detrimental effect on the optical transmission since the particles are relatively large compared to the optical path (e.g., 10 microns diameter in single mode) and are therefore likely to block at least a portion of the optical transmission. Furthermore, in high-vibration environments, optical connectors having ferrules in physical contact tend to experience scratching at their interface. This scratching diminishes the finish of the fiber end face, thereby increasing reflective loss and scattering.

To avoid problems of debris and vibration, a connector has been developed which expands the optical beam and transmits it over an air gap between the connectors. By expanding the beam, its relative size increases with respect to the debris, making it less susceptible to interference. Further, transmitting the beam over an air gap eliminates component-to-component wear, thereby increasing the connector's endurance to vibration. Over the years, the expanded beam connector has evolved into a ruggedized multi-fiber connector comprising an outer housing which is configured to mate with the outer housing of a mating connector, typically through a screw connection. Contained within the outer housing are a number of inner assemblies or "inserts." Each insert comprises an insert housing, a ferrule assembly contained within the insert housing and adapted to receive a fiber, and a ball lens at a mating end of the insert housing optically connected to the fiber. The ball lens serves to expand and collimate light through (or near) the connector interface. When two expanded beam connectors are mated, there is an air gap between the ball lenses of each pair of optically coupled inserts.

One of the most demanding tasks for an expanded bean connector is to maintain the optical alignment between the fiber and the lens. Radial offsets of only a few microns can affect insertion losses significantly. The insert assemblies mentioned above have traditionally performed well in maintaining optical alignment in a given channel using alignment pins and a spring force to maintain contact between the insert interfaces.

In U.S. Pat. No. 7,775,725 (herein the "'725 patent," incorporated by reference in its entirety), a single-channel expanded beam connector is disclosed that exploits the outside dimensions of various optical components to hold and align them in a discrete optical subassembly. These components can then be held in alignment in a compact, cylindrical sleeve to form the subassembly. This patent also discloses optically coupling different optical devices by conveniently aligning the subassembly of each device in a second, common sleeve. Thus, the patent discloses a single-channel connector having a small form factor and a low insertion loss (good optical alignment).

Although the '725 patent discloses a compact and reliable alignment approach for expanded beam connectors, Applicant has identified the need for a field installable expanded-beam connector system. The preset invention fulfills this need among others.

SUMMARY OF INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention provides a field-installable expanded beam connector. Specifically, the invention modularizes and segregates the ferrule assembly from the lens assembly, yet allows them to be connected readily in the field through a reliable mechanical interengagement. This way, a fiber may be terminated to the ferrule assembly in the field before he ferrule assembly is attached to (and thus encumbered by) the lens assembly. In other words, by providing these components as discrete components, the lens assembly does not obstruct access to the ferrule assembly, thereby allowing a fiber to be field terminated to the ferrule using traditional termination and polishing techniques. Furthermore, in one embodiment, the mechanical interengagement is reversible, allowing the user to separate the ferrule assembly from the lens assembly. This offers significant advantages, including, for example, the ability to clean between the ferrule and lens if necessary, or the ability to replace just the ferrule assembly or just the lens assembly in the event one fails or is no longer suited for the application. The connector system of the invention also exploits the outside dimensions of various optical components to hold and align them in a discrete optical subassemblies as disclosed in the '725 patent. Still other benefits will be obvious to those of skill in the art in light of this disclosure.

Accordingly, one aspect of the present invention is a expanded beam connector kit, comprising: (a) a first lens assembly having a front and rear orientation and comprising at least: a first base having a first interengagement mechanism for interengaging with a second interengagement mechanism of a first ferrule assembly; a first inner sleeve extending from the first base; a first lens disposed at least partially in the first inner sleeve such that the first lens is axially aligned in the first inner sleeve; and, in one embodiment, (b) the first ferrule assembly comprising at least: a first ferrule holder; the second interengagement mechanism forward of the first ferrule holder; and a first ferrule extending forward from the first ferrule holder and having a first end face.

Another aspect of the invention is method of terminating a fiber in an expanded beam connector in the field. In one embodiment, the method comprises: (a) terminating a first fiber in a first ferrule assembly; (b) mechanically interengaging a first lens assembly with the first ferrule assembly such that an end face of a ferrule of the first ferrule assembly is a certain distance from a first lens in the first lens assembly; (c) terminating a second fiber in a second ferule assembly; (d) mechanically interengaging a second lens assembly with the second ferrule assembly such that an end face of a ferrule of the second ferrule assembly is the certain distance from a second lens in the second lens assembly; and (e) inserting a first inner sleeve of the first lens assembly into an outer sleeve of the second lens assembly such that the first and second lens are a second certain distance apart, thereby optically coupling the first and second fibers.

BRIEF DESCRIPTION OF DRAWINGS

FIGS. 1(a) & (b) show one embodiment of the first and second inner sleeves, respectively, of the present invention.

FIGS. 2(a) & (b) show one embodiment of the assembled first and second lens assemblies, respectively, of the present invention.

FIGS. 3(a) & (b) show one embodiment of the first and second ferrule assemblies, respectively, of the present invention.

FIGS. 4(a) & (b) show the first and second lens assemblies of FIGS. 2(a)&(b) interengaged with the first and second ferrule assemblies of FIGS. 3(a) & (b) to form first and second subassemblies, respectively.

FIG. 5 shows the first and second subassemblies of FIGS. 4(a) & (b) mated.

DETAILED DESCRIPTION

Figure 6:
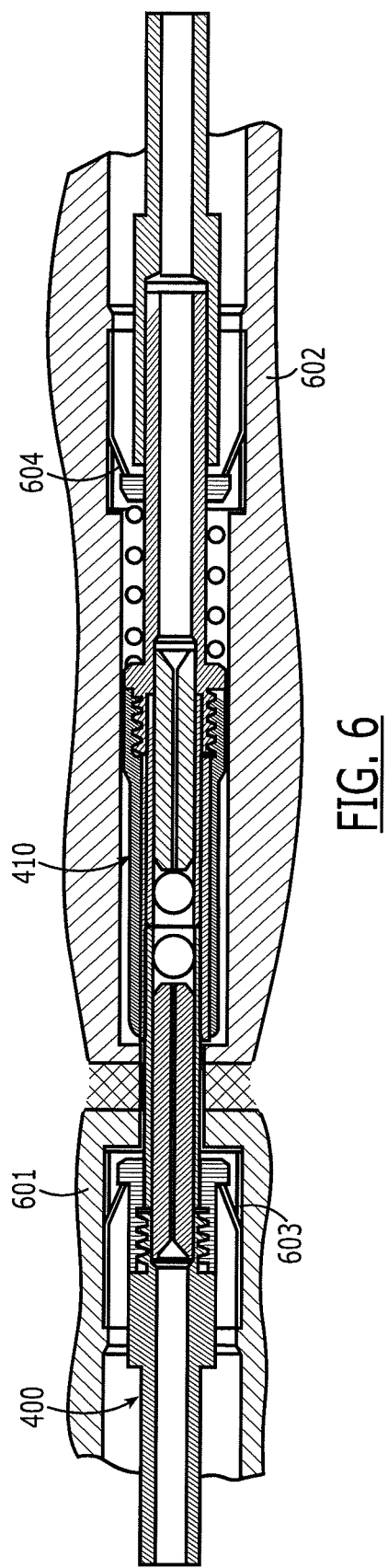
FIG. 6 shows a cross sectional view of the first and second connectors of FIGS. 4(a) & (b) disposed in a 38999-type plug and receptacle housings, respectively.

The present invention provides for a field-installable expanded-beam connector system. Referring to FIG. 2(a), a first lens assembly 200 of the expanded beam connector kit is shown. The first lens assembly 200 has a front and rear orientation, and comprising at least a first base 201 having a first interengagement mechanism 203 for interengaging with a second interengagement mechanism 303 of a first ferrule assembly 300 (see FIG. 3(a)). Extending from the first base 201 is a first inner sleeve 101 (also shown in FIG. 1(a)). A first lens 102 is disposed at least partially in the first inner sleeve 101 such that the first lens is axially aligned in the first inner sleeve.

The function of the inner sleeves is to hold and align the optical components, which in this embodiment, are the ferrule (discussed below with respect to FIG. 3(a)) and the lens 102, although the optical components may also include a glass block (as disclosed in U.S. Patent Publication No. 20080050073). In one preferred embodiment, the optical components have approximately the same outer diameter such that the cylindrical inner sleeve 101 holds them in optical alignment.

The inner sleeve is preferably formed from a precision material such as a metal (e.g., phosphor-bronze) or a ceramic. In one embodiment, the inner sleeve is a simple cylinder for ease of manufacturing and assembly. In one embodiment, the inner sleeve 101 is complaint with respect to its inner diameter to facilitate incorporation of the lens (discussed below). To impart compliance in embodiments in which the inner sleeve comprises a rigid material (e.g., ceramic), the inner sleeve may defines a slot 103 along its length.

The first lens 102 functions, in one respect, to expand and collimate a relatively narrow optical beam emitted from a fiber into a relatively large beam for transmission through an air gap. The collimated beam is received by a similar lens 112 (see FIGS. 1(b) and 2(b)) which focuses the beam onto the end face of the receiving fiber of the mating structure as is known in the art. Suitable lenses include, for example, a ball lens, a GRIN lens, or a lens or lens assembly containing spherical or aspherical surfaces with uniform or graded index lenses. In one embodiment, the lenses 102, 112 are ball lenses coated with an antireflective (AR) material for an air/glass interface. The coating may be applied only at the region that the light path passes through the lens, or it may be applied uniformly around the ball lens for simplicity and ease of manufacture (i.e., no need to align the lens in the housing). In another embodiment, the lens is defined in a lens body such as disclosed in U.S. patent application Ser. No. 13/486,590, hereby incorporated by reference in its entirety.

The optical subcomponents can be disposed within the inner sleeve in several ways. It is preferable for the lens to be secured in the inner sleeve to resist movement. For example, in one embodiment, the lens is held in the sleeve with an interference fit. This provides reasonable alignment and stability in optical performance when exposed to thermal extremes. In another embodiment, there is a very small assembly clearance between the lens and the sleeve, allowing the lens to be moved inside the sleeve and then affixed in place with epoxy. This will allow active optical positioning and monitoring during the epoxy cure period. Finally, a combination of interference and epoxy fixation may be used. Alternatively, the sleeve 101 may be compliant as discussed above. This way, its inner diameter can be slighting less than that of the lens 102, but it expanded to receive the lens 102 and thus hold the lens 102 through an interference fit. Again, to further secure the lens to the inner sleeve, epoxy 104 may be applied to the edge of the lens as shown in FIG. 1(a).

Referring to FIG. 3(a), a first ferrule assembly 300 of the expanded beam connector kit is shown. In one embodiment, the first ferrule assembly 300 comprises a first ferrule holder 301, the second interengagement mechanism 303 (mentioned above) forward of the first ferrule holder 301, and a first ferrule 302 extending forward from the first ferrule holder and having a first end face 309. In the embodiment shown in FIG. 3(a), the first ferrule holder and the first ferrule are discrete, although they may be integrally formed.

As is known, the first ferrule 302 holds an optical fiber in a borehole 304. In one embodiment, the fiber protrudes from the ferrule and is received in a lens body as disclosed in U.S. patent application Ser. No. 13/486,590, hereby incorporated by reference in its entirety.

The lens and the ferrule have about the same outside diameter such that, when the lens assembly is interengaged with the ferrule assembly, the ferrule 302 and the lens 102 are held in optical alignment in the inner sleeve 101.

An important aspect of the expanded beam connector kit is the interengagement mechanisms that enable the ferrule assembly and lens assembly to be connected in the field. Prior to their connection, they can be handled as discrete, modular units, facilitating the termination of the fiber in the ferrule without encountering interference from the lens assembly. The interengagement mechanisms not only serve to connect the ferrule assembly with the lens assembly, but also secure the ferrule within the inner sleeve. As mentioned above, because the lens and ferrule are essentially the same diameter, when both are situated in the sleeve, axially alignment is assured.

Different types of interengagement mechanisms can be practiced within the scope of the invention. For example, the mechanisms may include cooperating threaded members, bayonet-type connectors, resilient latches which snap into corresponding apertures, interference fit, set screws, adhesive interface, compression fittings, and any other know mechanism for interconnecting two components. Generally, although not necessarily, mechanical interconnections that tend to be reversible, such as threads, are preferred over adhesive type connections, which tend not to be reversible. Also preferred, although not necessary, are mechanisms suited for cylindrical components such as threads.

Referring to FIGS. 2(a) and 3(a), the first and second interconnection mechanisms are shown as first and second threaded portions 203a and 303a. Although this disclosure details threaded interconnections, the invention is not limited to such an embodiment unless specifically limited in the claims. In the embodiment of FIG. 2(a), the threaded portion 203a, is forward of the base and encircles the first inner sleeve. The first threaded portion is also integral with the first base in this particular embodiment, although it may also be discrete from the first base. Referring to the embodiment of FIG. 3(a), the second threaded portion 203a is forward of the first ferrule holder and encircles a rear portion of the first ferrule. In this particular embodiment, the first ferrule holder and the second threaded portion are integral, although these component may also be discrete.

Because the inner sleeves serves to hold the lens and ferrule in optical alignment, the difference between the outside diameter of the ferrule and lens and the inside diameter of the inner sleeve should be no greater than the maximum allowable radial offset between the optical axes of the ferrule and lens. Generally, this is no more than about 4 µm (Multi mode fiber system), and preferably no more than about 3 µm, and even more preferably no more than about 1.5 µm (Single mode fiber system).

Referring to FIG. 4(a), the first and second interengagement mechanism 203, 303 are interengaged, thereby connecting the lens assembly with ferrule assembly. The combination of the lens assembly and the ferrule assembly is referred to herein as an "optical subassembly" or "subassembly." As mentioned above, in this configuration the ferrule is held securely in the inner sleeve to ensure radial alignment with the lens.

In one embodiment, the lens 102 and the ferrule end face 309 are also axially aligned. In one embodiment, this axial alignment is a certain distance between the lens surface and the ferrule end face to create an air gap. In one embodiment, an annular spacer (not shown) is placed between the lens and the ferrule to create this air gap. The annular spacer has a predetermined thickness to ensure that the distance between the edge of the lens 102 and the end face of the ferrule along the optical axis equals the focal length of the lens such that the fiber end face is positioned at the focal distance from the lens. The focal distance of the lens is partially a function of the lens material, and, for certain materials, the focal point may be positioned close to the lens surface. In this respect, in some embodiments, the certain distance may be zero. For example, for single mode systems, it is often preferable to use a lens material which has the focal point on its surface. This means the fiber makes physical contact with the lens material, and with the proper AR coating applied to the lens. The backreflection for this single mode system will be much reduced compared to a system where there is an airgap between the fiber and the lens. Generally, physical contact is used for single mode only as backreflection is not as critical for multi mode systems. The spacer in such an embodiment would extend no further than the rear-most point of the lens, and in some embodiments, no spacer may be used.

Rather than using a spacer, in one embodiment, the first base comprises a rearward-facing first shoulder and the ferrule holder comprises a forward-facing second shoulder such that when the threaded base is in threaded interengagement with the threaded portion and the first and second shoulders contact, establishing the certain distance between the ferrule end face and the lens. Still other approaches for spacing the lens from the ferrule end face will be obvious to one of skill in the art in light of this disclosure.

The subassembly 400 is configured to mate with a mating optical structure to optically couple the fiber(s) in the ferrule with the optical pathway(s) of the mating optical structure. The term "optical pathway," as used herein, refers to any medium for conducting optical signals including the following: a fiber or waveguide; a silica-based or polymeric structure in a substrate; or a silica-based or polymeric optical component. The term "mating component" refers to an optical package that contains or comprises the optical pathway. For example, a mating component may be another connector, herein a "mating connector" or it may be an optical device in which the optical pathway is an integral component. Examples of optical devices include passive devices, such as, add/drop filters, arrayed waveguide gratings (AWGs), splitters/couplers, and attenuators, and active devices, such as, optical amplifiers, transmitters, receivers and transceivers.

The mating structure depicted in FIG. 4(b) is a second optical subassembly 410, which, in many respects, is similar to subassembly 400. Although the mating structure is depicted as a connector, it should be understood that other embodiments of the mating structure are possible within the scope of the present invention. For example, the mating structure may also be an adapter, which may be discrete for interfacing the connector of the present invention to another connector, or it may be integrated into a transceiver or other optical device. Still other mating structures as described above are possible.

Referring to FIGS. 1(b) and 2(b), subassembly 410, like subassembly 400, comprises a second lens assembly 210 interengaged with a second ferrule assembly 310. Specifically, the second lens assembly comprises a second base 211 having a third interengagement mechanism 213 for interengaging with a fourth interengagement mechanism 313 of a second ferrule assembly 310 (see FIG. 3(b)), a second inner sleeve 111 extending from the second base 211, and a second lens 112 disposed at least partially in the second inner sleeve 111 such that the second lens 112 is axially aligned in the second inner sleeve. In this particular embodiment, the second inner sleeve extends to the rear of the second base.

In the embodiment shown in FIGS. 4 (a) and (b), the second inner sleeve is shorter than the first inner sleeve. This is because the optical subassembly 410 is configured as a receptacle, while the subassembly 400 is configured as a plug. It should be understood however, that these configures are arbitrary and the function of the first and second optical subassemblies may be readily reversed.

Referring to FIG. 3(b), the optical subassembly 410 also comprises a second ferrule assembly 310. The second ferrule assembly 310 comprises a second ferrule holder 311, a fourth interengagement mechanism 313 forward of the second ferrule holder 311, and a second ferrule 312 extending forward from the second ferrule holder. In this particular embodiment, the second ferrule assembly comprises an annular space 317 between the second ferrule 312 and the second threaded portion 313a to receive the first inner sleeve 101.

In this particular embodiment, the ferrule assembly 310 also comprises a rear body 315 in which the ferrule holder 311 is press fit, and a retainer 316, which is slidably mounted around the ferrule holder 311, in front of the rear body. The retainer 316 functions as a backstop for a spring 314, which serves to bias the ferrule holder 311 and thus the ferrule 312 forward relative to the connector housing 602 (discussed with respect to FIG. 6 below).

In one embodiment, another component of the field-installable expanded beam is an outer sleeve 215 as shown in FIG. 2(b). The outer sleeve functions to align the inner sleeves 101, 111. To this end, the outer sleeve receives at least partially the first and/or second inner sleeves 101, 111 and holds them in alignment such that the optical components contained in the inner sleeves (e.g., ferrule and lens) are all held in alignment. In one embodiment, the inside diameter of the outer sleeve is toleranced very closely to the outside diameter of the inner sleeves such that the inner sleeves are held in close alignment to one another. This can be done in different way. For example, the outside diameter of the inner sleeves may be just slightly less than the inside diameter of the outer sleeve. Alternatively, the outer sleeve may be compliant such that its inner diameter is the same or even slightly less than the outer diameter of the inner sleeves but expands to receive the inner sleeves. Means of rendering the outer sleeve complaint are known and include, for example, manufacturing the outer sleeve from compliant materials such as polymers, or defining a slot 216 along at least part of the length to impart compliance in an otherwise rigid material. In any event, the difference between the outside diameter of the inner sleeve and the inside diameter of the outer sleeve generally should be no greater than the maximum allowable radial offset between the optical axes of the lens. As mentioned above, this is no more than about 4 µm (multi mode fiber system), and preferably no more than about 3 µm, and even more preferably no more than about 1.5 µm (single mode fiber system).

Referring to FIG. 2(b), in this embodiment, the outer sleeve 215 is permanently attached to the second lens assembly 210, which, as mentioned above, is the receptacle side of the connector system. The outer sleeve defines a cavity 218 to receive the first inner sleeve 101. Although the outer sleeve 215 is shown associated with the lens assembly 210, it should be understood, however, that the outer sleeve 215 may be, instead, incorporated into lens assembly 200, the plug side of the connector, such that, during mating, the outer sleeve 215 would receive the second inner sleeve 111, rather than receiving the first inner sleeve 101. The choice of which lens assembly to attach the outer sleeve depends on preference and the application. The outer sleeve may be permanently attached to one of the inner sleeves in various ways including by an interference fit or by adhesion.

In this embodiment, the outer sleeve is totally contained within the base 211, which is preferable from a protection standpoint, although other embodiments may have the outer sleeve extending from the base 211.

As shown in FIG. 1, the outer sleeve 215 is a discrete component from the base 211. Such a configuration allows the outer sleeve to be manufactured separately from the housing, thus facilitating the use of precision manufacturing techniques that may be superfluous for other portions of the base 211. Nevertheless, in certain embodiments, it may be preferable for the outer sleeve 215 to be integral with the base 211. In yet other embodiments, the outer sleeve 215 may be integrated with one of the inner sleeves 101, 111. Specifically, to the extent that the outer sleeve 215 is fixed in position relative to an inner sleeve 101, 111, it may be integral, integrally molded, formed or otherwise secured to the inner sleeve.

As mentioned above, it is critical that there is a low tolerance fit between the outer diameter of the inner sleeves and the inner diameter of the outer sleeve such that the inner sleeves are held in alignment within the outer sleeve. Although minimal tolerance is desired, it is generally recognized that if the tolerance is too tight, the ability of the inner sleeve to slide within the outer sleeve during mating may be compromised. Approaches for facilitating sliding of the inner sleeve within the outer sleeve and reducing binding are disclosed in the '725 patent and are hereby incorporated by reference. In addition to these approaches, insertion of the inner sleeve within the outer sleeve may be enhanced by adding lead-ins 217 on the forward edge of the outer sleeve 215. The lead-ins 217 are chamfered edges with tend to align the inner sleeve with the outer sleeve during mating.

Referring to FIG. 6, the optical subassemblies 400, 410 are disposed in plug and receptacle housings 601, 602, respectively. The housings 601, 602 in this embodiment are well-known MIL-DTL-38999, type III connectors, which are ruggedized connectors typically used for electrical connectors. The housings provide a rigid structure that serves to align and secure the subassemblies 400, 410 during mating. Although MIL-DTL-38999, type III connectors are disclosed herein in detail, the compact design of the subassemblies of the present invention facilitates their use with traditional connectors systems such as backplane connectors, Mother/Daughter card connectors, or Quadrax type connectors.

In one embodiment, the optical components such as the ferrule and lens are narrower than the optical components typically used in the housings. By using more narrow components, additional room is afforded to accommodate the interengagement mechanisms. That is, the interengagement mechanisms generally consume space. Thus, if traditional housings, such as the housings for the 38999-style connectors are used, narrower optical components may be required to accommodate the interengagement mechanisms as shown in FIG. 6. In this particular embodiment, the ferrule and lens have a diameter of about 1.25 mm, which is approximately half the diameter typically used in the 38999-style connectors. To compensate the reduced diameter and to prevent the components from moving within the larger cavities of the housings, clips 603, 604 are used to secure and center the subassemblies 400, 410 in the plug and receptacle housings 601, 602, respectively.

As mentioned above, an important advantage of the configuration of the connector of the present invention is that it facilitates field installation. That is, because the lens assembly is a separate, discrete component from the ferrule assembly, a fiber may be terminated in the field using know techniques, without obstruction from the lens assembly. Accordingly, in one embodiment, the method of terminating the connector comprises: (a) terminating a first fiber in a first ferrule assembly; (b) mechanically interengaging a first lens assembly with the first ferrule assembly such that an end face of a first ferrule of the first ferrule assembly is a certain distance from a first lens in the first lens assembly; (c) terminating a second fiber in a second ferule assembly; (d) mechanically interengaging a second lens assembly with the second ferrule assembly such that an end face of a ferrule of the second ferrule assembly is the certain distance from a second lens in the second lens assembly; and, as shown in FIG. 5, (e) inserting a first inner sleeve 101 of the first lens assembly 200 into an outer sleeve 215 of the second lens assembly 210 such that the first and second lenses 102, 112 are a second certain distance apart, thereby optically coupling the first and second fibers (not shown). These steps are considered in more detail below.

In steps (a) and (c), each ferrule assembly is terminated with an optical fiber and the following polishing process in accordance to known standard termination procedures. An advantage of the present invention is that the end face 309 of the ferrule can be prepared (i.e., polished) prior to the ferrule's installation into the inner sleeve. This allows the end face 309 to be configured with any known end face geometry using known techniques and apparatus. For example, the end face 309 (and/or the corresponding end face of the second ferrule 312) may be polished to have a flat or curved end face or an APC end face. If a cable with strength members is used for retention, these can be crimped onto the rear body 315 of the ferrule assembly using a crimp eyelet as is known. It should be appreciated that steps (a) and (c), terminating the fibers in the ferrules, may be performed before steps (b) and (d), combining the lens assemblies with the ferrule assemblies. It should also be understood that, in some embodiments, only one fiber would need to be terminated. That is, in certain situations, either the first or the second ferrule assembly will be preterminated with a fiber.

In steps (b) and (d), as mentioned above, the certain distance between the ferrule end face and the lens, can be defined by a spacer or by having the base of the lens assembly seat on the ferrule assembly. Alternatively, in one embodiment in which the interengagement mechanisms are threaded portions and the threads are sufficiently fine, the certain distance may be controlled by threading the threaded portions together to a precise point, and then fixing them in place with epoxy. In any event, thread locking adhesion can be applied if desired to secure the assemblies. Still other approaches will be obvious to one of skill in the art in light of this disclosure.

In step (e), FIG. 5 shows the subassemblies 400, 410 in a mated position where the leading edge of the first inner sleeve 101 enters the outer sleeve 215 until it butts against the leading edge of second inner sleeve 111, thereby defining the second certain distance between the first and second lenses.

Having thus described a few particular embodiments of the invention, various alterations, modifications, and improvements will readily occur to those skilled in the art. Such alterations, modifications, and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

What is claimed is:

1. An expanded beam connector kit, comprising:
a first lens assembly having a front and rear orientation and comprising at least:
a first base having a first interengagement mechanism for interengaging with a second interengagement mechanism of a first ferrule assembly;
a first inner sleeve extending from said first base, said inner sleeve being cylindrical and having constant inside diameter;
a first lens disposed at least partially in said first inner sleeve, said first lens having a lens diameter and being held in said first inner sleeve with a snug fit such that said first lens is axially aligned in said first inner sleeve; and
said first ferrule assembly, said first ferrule assembly comprising at least:
a first ferrule holder;
said second interengagement mechanism forward of said first ferrule holder; and
a first ferrule extending forward from said first ferrule holder and having a first end face, said first ferrule being cylindrical and having a ferrule diameter about the same as said lens diameter such that said firs inner sleeve holds said first ferrule and said first lens in axially alignment.

2. The expanded beam connector kit of claim 1, wherein said first interengagement mechanism is a first threaded portion.

3. The expanded beam connector kit of claim 2, wherein said first threaded portion is integral with said first base.

4. The expanded beam connector kit of claim 1, wherein said first lens assembly further comprises:
an outer sleeve containing said first inner sleeve and extending beyond said first inner sleeve to define a cavity, said cavity being configured to receive a second inner sleeve having the same outer diameter as said first inner sleeve.

5. The expanded beam connector kit of claim 4, wherein said first inner sleeve extends to the rear of said first base.

6. The expanded beam connector kit of claim 1, wherein said second interengagement mechanism is a second threaded portion forward of said first ferrule holder and encircling a rear portion of said first ferrule.

7. The expanded beam connector kit of claim 6, wherein said first ferrule holder and said second threaded portion are integral.

8. The expanded beam connector kit of claim 6, wherein said first ferrule assembly comprises an annular space between said first ferrule and said second threaded portion, said annular space configured to receive said first inner sleeve.

9. The expanded beam connector kit of claim 1, further comprising:
a spacer configured to be disposed between said first lens and said first ferrule to position said first end face a certain distance from said lens.

10. The expanded beam connector kit of claim 1, further comprising:
a second lens assembly comprising at least:
a second base having a third interengagement mechanism for interengaging with a fourth interengagement mechanism of a second ferrule assembly;
a second inner sleeve extending from said second base;
a second lens disposed at least partially in said second inner sleeve such that said second lens is axially aligned in said second inner sleeve; and
an outer sleeve containing said second inner sleeve and extending beyond said second inner sleeve to define a cavity, said cavity being configured to receive said first inner sleeve.

11. The expanded beam connector kit of claim 10, wherein further comprising:
said second ferrule assembly, said second ferrule assembly comprising at least:
a second ferrule holder;
said fourth interengagement mechanism forward of said second ferrule holder; and
a second ferrule extending forward from said second ferrule holder.

12. The expanded beam connector kit of claim 11, wherein said third and fourth interengagement mechanisms are third and fourth threaded portions, respectively.

13. The expanded beam connector kit of claim 12, wherein said second inner sleeve extends to the rear of said second base, and said second ferrule assembly comprises an annular space between said second ferrule and said fourth threaded portion, said annular space configured to receive said second inner sleeve.

14. The expanded beam connector kit of claim 11, wherein said second ferrule assembly further comprises a rear body for holding said second ferrule holder, a retainer slidably mounted on said ferrule assembly and a spring between said second ferrule holder and said retainer.

15. The expanded beam connector kit of claim 1, further comprising
a plug housing for receiving a subassembly of said first lens assembly and said ferrule assembly; and
a receptacle housing for receiving a subassembly of said second lens assembly and said second ferrule assembly.

16. A method of optically connecting first and second fibers, said method comprising:
(a) terminating a first fiber in a first ferrule assembly, wherein said first ferrule assembly comprises at least a first ferrule holder, a second interengagement mechanism forward of said first ferrule holder, and said first ferrule extending forward from said first ferrule holder and having a first end face, said first ferrule being cylindrical and having a ferrule diameter;
(b) sliding a first inner sleeve of a first lens assembly over said first ferrule and mechanically interengaging a first interengagement mechanism of said first lens assembly with said second interengagement mechanism of said first ferrule assembly such that said end face of said first ferrule of said first ferrule assembly is a certain distance from a first lens in said first lens assembly, wherein said first lens assembly comprises at least a first base having said first interengagement mechanism, and a first inner sleeve extending from said first base, said inner sleeve being cylindrical and having a constant inside diameter, said first lens disposed at least partially in said first inner sleeve, said first lens having a lens diameter about the same as said ferrule diameter, said lens diameter and said ferrule diameter being about the same as said inner diameter such that said first inner sleeve holds said first ferrule and said first lens in axially alignment;
(c) terminating a second fiber in a second ferrule assembly;
(d) mechanically interengaging a second lens assembly with said second ferrule assembly such that an end face of a ferrule of said second ferrule assembly is said certain distance from a second lens in said second lens assembly;
(e) inserting a first inner sleeve of said first lens assembly into an outer sleeve of said second lens assembly such that said first and second lens are a second certain distance apart, thereby optically coupling said first and second fibers.

17. The method of claim 16, wherein steps (a) and (c) are performed before steps (b) and (d).

18. The expanded beam connector kit of claim 1, wherein said first inner sleeve and said first base are discrete components.

19. The expanded beam connector kit of claim 18, wherein said first inner sleeve is a simply cylinder.

20. The expanded beam connector kit of claim 1, wherein said second interengagement mechanism is discrete from said first ferrule.

* * * * *